US009519600B2

(12) United States Patent
Lupu et al.

(10) Patent No.: US 9,519,600 B2
(45) Date of Patent: Dec. 13, 2016

(54) DRIVER SHIMMING

(75) Inventors: Corneliu I. Lupu, Sammamish, WA (US); Silviu C. Calinoiu, Redmond, WA (US); Cristian G. Petruta, Redmond, WA (US); Batsaihan Jargalsaihan, Bellevue, WA (US); Chris Ernest Matichuk, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/040,847

(22) Filed: Mar. 4, 2011

(65) Prior Publication Data
US 2012/0227057 A1 Sep. 6, 2012

(51) Int. Cl.
G06F 3/00 (2006.01)
G06F 13/20 (2006.01)
G06F 9/44 (2006.01)
G06F 9/455 (2006.01)

(52) U.S. Cl.
CPC .............. *G06F 13/20* (2013.01); *G06F 9/44* (2013.01); *G06F 9/4411* (2013.01); *G06F 9/455* (2013.01)

(58) Field of Classification Search
CPC ........ G06F 13/20; G06F 9/4411; G06F 9/455; G06F 9/44
See application file for complete search history.

(56) References Cited

U.S. PATENT DOCUMENTS

| 5,390,301 A | 2/1995 | Scherf |
| 5,675,740 A | 10/1997 | Heimsoth et al. |
| 5,745,763 A | 4/1998 | Mealey et al. |
| 5,974,474 A | 10/1999 | Furner et al. |
| 6,158,011 A * | 12/2000 | Chen et al. ...................... 726/15 |
| 6,363,409 B1 * | 3/2002 | Hart et al. .......................... 718/1 |
| 6,385,663 B2 | 5/2002 | Senator |
| 6,591,417 B1 * | 7/2003 | Strysniewicz et al. ........ 717/168 |
| 6,745,385 B1 * | 6/2004 | Lupu et al. ..................... 717/163 |
| 7,323,970 B1 | 1/2008 | Murray et al. |
| 7,334,227 B2 | 2/2008 | Kim et al. |

(Continued)

FOREIGN PATENT DOCUMENTS

| CN | 1627258 | 6/2005 |
| CN | 1838060 | 9/2006 |

(Continued)

OTHER PUBLICATIONS

Russell, Rusty., "Virtio: Towards a De-Facto Standard for Virtual I/O Devices", Retrieved at << http://ozlabs.org/~rusty/virtio-spec/virtio-paper.pdf >>, ACM SIGOPS Operating Systems Review—Research and developments in the Linux kernel, vol. 42, No. 5, Jul. 2008, pp. 9.

(Continued)

*Primary Examiner* — H S Sough
*Assistant Examiner* — Carina Yu
(74) *Attorney, Agent, or Firm* — Timothy Churna; Dan Choi; Micky Minhas

(57) ABSTRACT

Driver shimming techniques are described. In one or more implementations, an identification is made as to which interfaces and callbacks are utilized by a shim obtained for a driver of a computing device. The identified interfaces and callbacks are wrapped by the shim of the computing device such that calls to the wrapped interfaces and callbacks are intercepted by the shim.

20 Claims, 5 Drawing Sheets

(56) References Cited

U.S. PATENT DOCUMENTS

| | | |
|---|---|---|
| 7,392,527 B2 | 6/2008 | Callender |
| 7,478,381 B2 | 1/2009 | Roberts et al. |
| 7,870,565 B2 | 1/2011 | Durham |
| 7,996,814 B1 | 8/2011 | Qureshi et al. |
| 9,003,363 B2 | 4/2015 | Lupu et al. |
| 2002/0174264 A1 | 11/2002 | Fuller et al. |
| 2004/0003135 A1* | 1/2004 | Moore .......................... 709/321 |
| 2004/0215754 A1 | 10/2004 | Orleth et al. |
| 2005/0108369 A1 | 5/2005 | Sather et al. |
| 2005/0149947 A1* | 7/2005 | Callender ..................... 719/321 |
| 2005/0210463 A1 | 9/2005 | Abe |
| 2006/0149845 A1* | 7/2006 | Malin et al. .................. 709/228 |
| 2006/0190558 A1 | 8/2006 | Kanda et al. |
| 2006/0215573 A1 | 9/2006 | Terry et al. |
| 2007/0100653 A1 | 5/2007 | Ramer et al. |
| 2007/0101342 A1 | 5/2007 | Flegg et al. |
| 2007/0201059 A1 | 8/2007 | Radzykewycz et al. |
| 2007/0209032 A1* | 9/2007 | Mihai et al. .................. 717/126 |
| 2007/0277248 A1 | 11/2007 | Agrawal et al. |
| 2008/0140831 A1 | 6/2008 | Kawana et al. |
| 2008/0177994 A1 | 7/2008 | Mayer et al. |
| 2009/0167531 A1 | 7/2009 | Ferguson |
| 2010/0082714 A1 | 4/2010 | Herron et al. |
| 2010/0306584 A1 | 12/2010 | Nishimura et al. |
| 2011/0067038 A1* | 3/2011 | Troccoli et al. ............. 719/327 |
| 2011/0225193 A1 | 9/2011 | Jennings et al. |
| 2012/0131253 A1 | 5/2012 | McKnight |
| 2012/0198514 A1* | 8/2012 | McCune et al. .................. 726/1 |
| 2012/0239800 A1 | 9/2012 | Matichuk |
| 2012/0246632 A1 | 9/2012 | Lupu et al. |
| 2012/0256760 A1 | 10/2012 | Johnson et al. |
| 2015/0277936 A1 | 10/2015 | Lupu et al. |

FOREIGN PATENT DOCUMENTS

| | | |
|---|---|---|
| CN | 101694642 | 4/2010 |
| WO | WO 2006066881 | 6/2006 |
| WO | WO 2006128153 | 11/2006 |

OTHER PUBLICATIONS

"Windows Filtering Platform", Retrieved at << http://www.worldlingo.com/ma/enwiki/en/Windows_Filtering_Platform , Retrieved Date: Dec. 30, 2010, pp. 3.

"SP_DEVINSTALL_PARAMS Structure", Retrieved at << http://msdn.microsoft.com/en-us/library/fl552346.aspx>>, Retrieved Date: Dec. 30, 2010, pp. 8.

"PCT Search Report and Written Opinion", Application No. PCT/US2012/028667, (Oct. 31, 2012), 8 pages.

"Non-Final Office Action", U.S. Appl. No. 13/052,757, (Jan. 17, 2013), 13 pages.

"Non-Final Office Action", U.S. Appl. No. 13/052,757, Oct. 25, 2013, 15 pages.

"Extended European Search Report", EP Application No. 12760583.0, Sep. 5, 2014, 7 pages.

"Notice of Allowance", U.S. Appl. No. 13/052,757, Nov. 26, 2014, 8 pages.

"First Office Action and Search Report Issued in Chinese Patent Application No. 201210075509.3", Mailed Date: Apr. 7, 2016, 12 pages.

Office Action dated Feb. 25, 2016 cited in U.S. Appl. No. 14/658,770.

Final Office Action dated Aug. 11, 2016 cited in U.S. Appl. No. 14/658,770.

"Office Action and Search Report Issued in Chinese Patent Application No. 201210054773.9", Mailed Date: Jul. 25, 2016, 13 Pages.

Final Office Action, U.S. Appl. No. 13/052,757, Apr. 3, 2014, 20 pages.

* cited by examiner

DRIVER SHIMMING

BACKGROUND

Computing devices may include a variety of different hardware devices to expand the functionality available to the computing device. For example, devices may include internal devices that may be configured within a housing of the computing devices as well as external devices, such as printers, cameras, and so on. Drivers are typically employed to enable communication between an operating system of the computing device and the devices.

The continuing development of operating systems, however, may cause changes in how the operating systems interact with the drivers. Consequently, a driver that is compatible with a previous version of an operating system, for example, may not be compatible with later versions of the operating system. Traditional techniques that were used to combat this incompatibility included writing a newer version of the driver. Although this may restore functionality of the device, the writing of the driver may involve a wait until the driver is available for dissemination, involve a user locating the newer version of the driver, and so on that could lead to user frustration and lost productivity.

SUMMARY

Driver shimming techniques are described. In one or more implementations, an identification is made as to which interfaces and callbacks are utilized by a shim obtained for a driver of a computing device. The identified interfaces and callbacks are wrapped by the shim of the computing device such that calls to the wrapped interfaces and callbacks are intercepted by the shim.

In one or more implementations, an I/O request packet is intercepted by a shim executed on a computing device that relates to communication with a driver that is executing on the computing device. Data is translated, by the shim, that relates to the I/O request packet to be compatible with the driver and the translated data is transmitted for communication to the driver.

In one or more implementations, installation of a driver is initiated on a computing device and the driver to be installed is identified. Based on the identification, a determination is made that a shim is available for the driver to communicate with an operating system. The shim is obtained for installation on the computing device and callbacks are identified that are utilized by the shim. The callbacks are wrapped by the shim such that calls to the callbacks are intercepted by the shim and an in-memory image of the driver is modified by the computing device using the wrapped callbacks.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Computing devices may include (e.g., be communicatively coupled to) a wide variety of different devices such that functionality of the device may be utilized by the computing device. For example, a computing device may be communicatively coupled to a printer, optical disc reader/writer, thumb drive, or other peripheral device that may be internal (e.g., within a housing) or external to the computing device. A driver may be utilized to enable communication between the computing device and the device, such as to translate commands and data from an operating system of the computing device into a form that is understandable by the device and vice versa. However, changes to the operating system may cause incompatibilities with the driver and consequently with the device, which may lead to user frustration.

Driver shimming techniques are described in which a shim may be used for compatibility with a driver for a device, such as compatibility between a kernel of an operating system and the driver. This compatibility may be provided in a variety of ways by a shim. For example, the shim may be used to intercept and translate data communicated between the kernel and the driver, such as data associated with function calls to application programming interfaces (APIs), callbacks, I/O request packets (IRPs), and so on. In this way, compatibility of the kernel of the operating system with the driver may be maintained and thereby functionality of the device may still be accessed by the operating system, even in instances of newer versions of the operating system.

The shims that are obtained to promote driver compatibility may be obtained in a variety of ways. For example, a service provider may provide a service that is accessible via a network which includes identification of issues with drivers and corresponding shims for those drivers. One or more shims may therefore be provided for execution with the driver to correct these issues, such as based on identification of the driver. Further, updates may also be provided in a form of shims to correct subsequent issues that are encountered. In this way, issues that arise after shipment of an operating system with a driver may be addressed even after the operating system has been installed and distributed, further discussion of which may be found in relation to FIG. 2.

In the following discussion, an example environment is first described that may be leveraged according to driver shimming techniques. Example procedures are then described which may also be employed in the example environment as well as other environments. Accordingly, performance of the example procedures is not limited to the example environment and the example environment is not limited to performing the example procedures.

Example Environment

Figure 1:
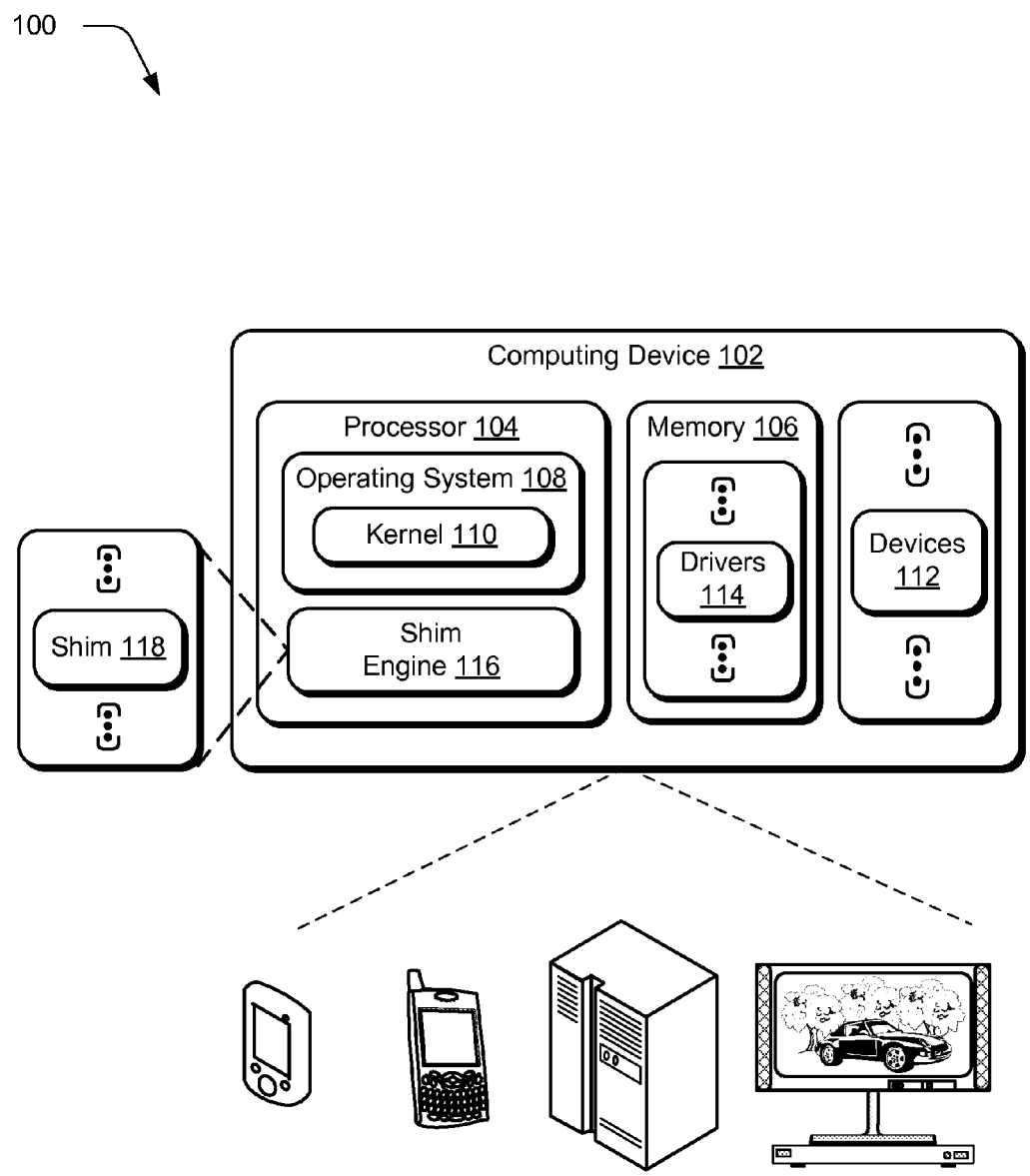
FIG. 1 is an illustration of an environment in an example implementation that is operable to perform driver shimming techniques.

FIG. 1 is an illustration of an environment 100 in an example implementation that is operable to employ techniques described herein. The illustrated environment 100 includes a computing device 102, which may be configured in a variety of ways. For example, the computing device 102 may be configured as portable game device, mobile phone, a computer that is capable of communicating over a network (e.g., a desktop computer, one or more servers, an entertainment appliance), a set-top box communicatively coupled to a display device, and so forth. Thus, the computing device 102 may range from full resource devices with substantial memory and processor resources (e.g., personal computers, game consoles) to a low-resource device with limited memory and/or processing resources (e.g., traditional set-top boxes, hand-held game consoles). Additionally, although a single computing device 102 is shown, the computing device 102 may be representative of a plurality of different devices, such as multiple servers utilized by a business to perform operations, a remote control and set-top box combination, and so on.

The computing device 102 may also include an entity (e.g., software) that causes hardware of the computing device 102 to perform operations, e.g., processors, functional blocks, and so on. For example, the computing device 102 may include a computer-readable medium that may be configured to maintain instructions that cause the computing device, and more particularly hardware of the computing device 102 to perform operations. Thus, the instructions function to configure the hardware to perform the operations and in this way result in transformation of the hardware to perform functions. The instructions may be provided by the computer-readable medium to the computing device 102 through a variety of different configurations.

One such configuration of a computer-readable medium is signal bearing medium and thus is configured to transmit the instructions (e.g., as a carrier wave) to the hardware of the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

The computing device 102 is also illustrated as including a processor 104 and memory 106. Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single processor 104 and memory 106 are shown, a wide variety of types and combinations of memory and/or processors may be employed.

The computing device 102 is illustrated as also includes an operating system 108 having a kernel 110 and one or more drivers 114 that are configured to support communication between the kernel 110 of the operating system 108 and one or more devices 112. The kernel 110 represents a component of the operating system 108 that is typically employed to abstract functionality of underlying devices such as the processor 108, memory 106, and other devices 112 to applications and other software that are executed by the computing device 102. Although the operating system 108 and kernel 110 are illustrated as being executed on the processor 104, these modules are also storable in memory 106.

The devices 112 may be representative of a variety of different devices that may be employed by the computing device 102. For example, the devices 112 may include peripheral devices, such as printers, scanners, hard drives, and so on. The devices 112 may also represent functionality of other computing devices that may be leveraged by the computing device 102, such as to use a mobile phone as a storage device, access photos on the mobile phone, and so on. Thus, the computing device 102 may leverage a variety of different devices 112 to add to the functionality of the computing device 102.

In order for the devices 112 to communicate with the computing device 102, and more particularly the operating system 108 and kernel 110 of the computing device, one or more drivers 114 may be employed. Drivers 114 are typically employed to abstract functionality of a corresponding device 112. For example, the driver 114 may be configured as a series of layers to translate commands from the kernel 110 of the operating system 108 into device specific commands that are "understandable" by a respective device.

As previously described, however, there may be some instances in which the driver 114 is not longer compatible with the kernel 110 of the operating system 108. For example, the operating system 108 may be updated to a newer version, have a service pack applied, and so on that may change how the operating system 108 is configured to communicate with the driver 114.

Accordingly, the computing device 102 may employ a shim engine 116 that is representative of functionality to provide one or more shims 118 to support compatibility of the drivers 114 with the kernel 110 of the operating system 108. A shim 118, for instance, may be configured as code that serves as an intermediary between the kernel 110 and the drivers 114 such that the kernel 110 is compatible with the drivers 114 and vice versa. A variety of different techniques 118 may be employed by the shim 118 to support compatibility, such as to translate or redirect commands, further discussion of which may be found in relation to FIG. 2.

Generally, any of the functions described herein can be implemented using software, firmware, hardware (e.g., fixed logic circuitry), manual processing, or a combination of these implementations. The terms "module," "engine," and "functionality" as used herein generally represent hardware, software, firmware, or a combination thereof. In the case of a software implementation, the module, functionality, or logic represents instructions and hardware that performs operations specified by the hardware, e.g., one or more processors and/or functional blocks.

Figure 2:
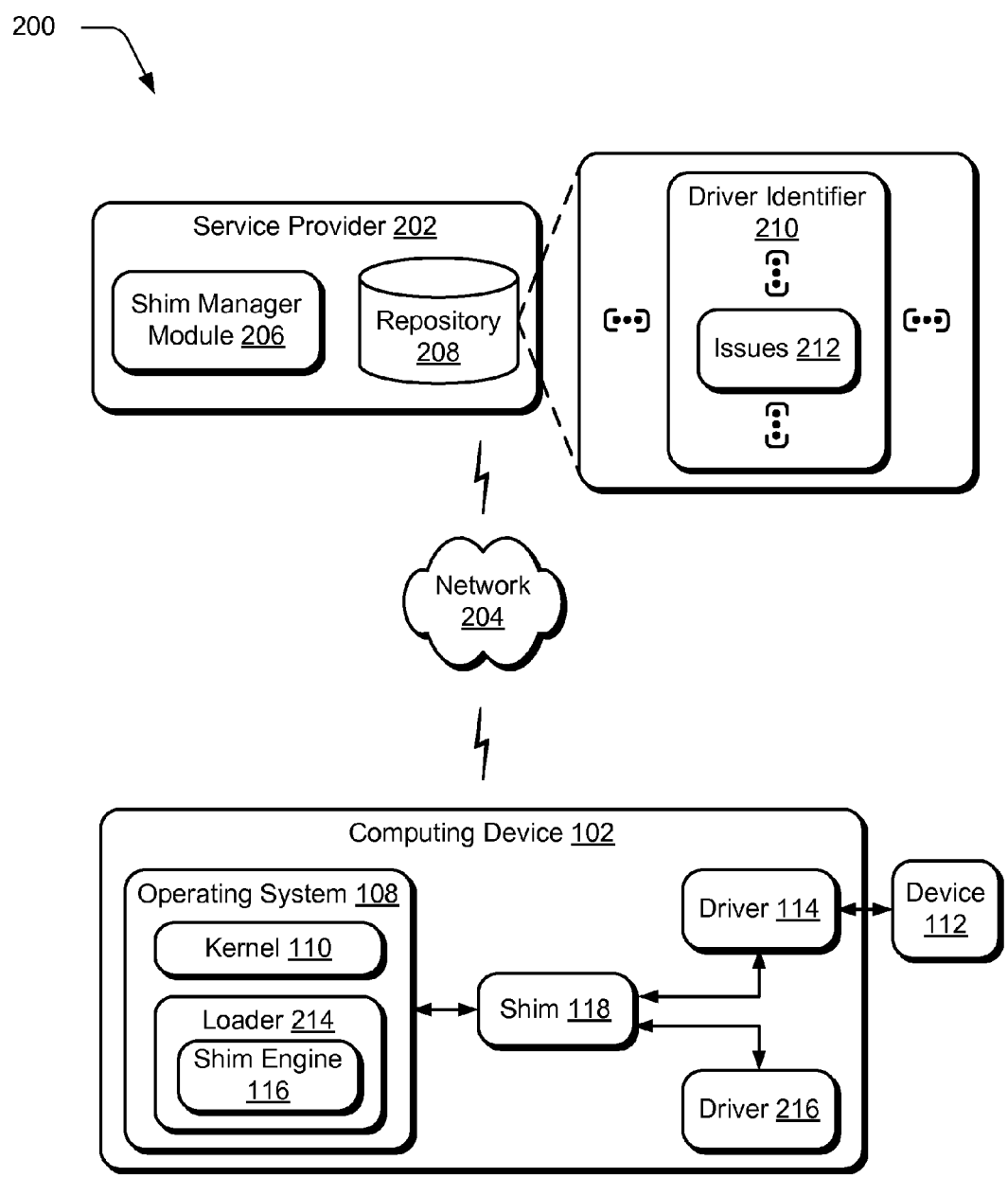
FIG. 2 is an illustration of a system in an example implementation showing dissemination and usage of a shim and shim engine of FIG. 1.

FIG. 2 is an illustration of a system 200 in an example implementation showing example operation of a shim engine 116 of FIG. 1. The system 200 includes a computing device 102 communicatively coupled to a service provider 202 via a network 204. The service provider 202 is illustrated as including a shim manager module 206 that is representative of functionality to manage a repository 208 to provide shims 116 for use with drivers 114.

For example, the repository 208 may include driver identifiers 210 and corresponding issues 212 of the identified drivers. This information may then be used to provide shims to the computing device 102 when loading a driver 114. In this way, the service provider 202 may provide a service such that up-to-date shims may be disseminated to computing devices 102 as warranted.

The computing device 102, for instance, may initiate a loader 214 of the operating system 108 to install a driver 114 such that an operating system 108 may communicate with a device 112. Accordingly, the loader 214 may employ the shim engine 116 to determine whether a shim 118 is available for the driver 114 being installed, such as by communicating an identifier of the driver 114 to the shim manager module 206. The shim manager module 206 may then use the driver identifier 210 to determine if there are any issues 212 with the driver 114 and then whether there are shims 116 available for driver 114. If so, the shim 118 may be communicated to the shim engine 116 for installation along with the driver 114. A variety of other examples of communication of the shim 118 are also contemplated, such as through part of a scheduled update to the operating system 108 (e.g., a service pack) and so on.

The shim 118 may be used to promote compatibility of the operating system 108 with the driver 114 in a variety of ways. For instance, drivers 114 may interact with components of the computing device 102 (e.g., kernel 110, other drivers) by calling exported interfaces (e.g., APIs), declaring callbacks to be called when certain events happen in the system (I/O manager request callbacks), and so on. Accordingly, the shim engine 116 may employ hooking such that addresses in an import address table (IAT) for one or more application programming interfaces are replaced with addresses corresponding to the shim 118. The shim 118 may also be configured to intercept callbacks, e.g., to be called upon occurrence of an event by the computing device 102. In this way, the shim 118 may intercept calls made to and from the APIs that are no longer compatible and translate data associated with the call such that it is compatible. In one such example, the shim 118 may translate the data to mimic a previous version of an operating system 108 such that the driver 114 may understand commands received by the driver.

In another instance, the shim 118 may be configured to intercept I/O request packets (IRPs) that may be used to support communication between the kernel 110 and the driver 114 without involving actual calls to an API. The shim engine 116, for instance, may modify declared addresses in a dispatch table such that the I/O request packets (IRPs) may be intercepted by the shim 118. The shim 118 may then translate data associated with the IRPs and forward this data for receipt by the intended driver 114.

Although these techniques described compatibility of the driver 114 with a kernel 110 of an operating system 108, the shim 118 may be used to promote compatibility with other drivers 216 of the computing device 102. Thus, the shim engine 116 may be employed to redirect the execution of calls and other communications by wrapping them inside a shim 118. Although illustrated separately, a fragment of code that implements the shim 118 may "live" inside a system component, driver 114, and so on. In one or more implementations, shims declare wrappers for interfaces or callbacks. If such a wrapper is applied towards a shim (e.g., at runtime), than a call to or from the driver to a system component is processed through the wrapper. Thus, the shim wrapper may control both inputs and outputs of an interface call and modify them to correct incompatibilities.

For example, the shim 118 may be configured to intercept callbacks (e.g., functions inside the driver) which may be called when a corresponding event occurs in the computing device 102. This technique is typically employed to support asynchronous code. Accordingly, the shim 118 may be used to wrap execution of such callbacks, also. In this way, the shim 118 may correct behavior even for callbacks that may be completed later in an asynchronous manner.

Example Procedures

The following discussion describes shared resource access verification techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 3:
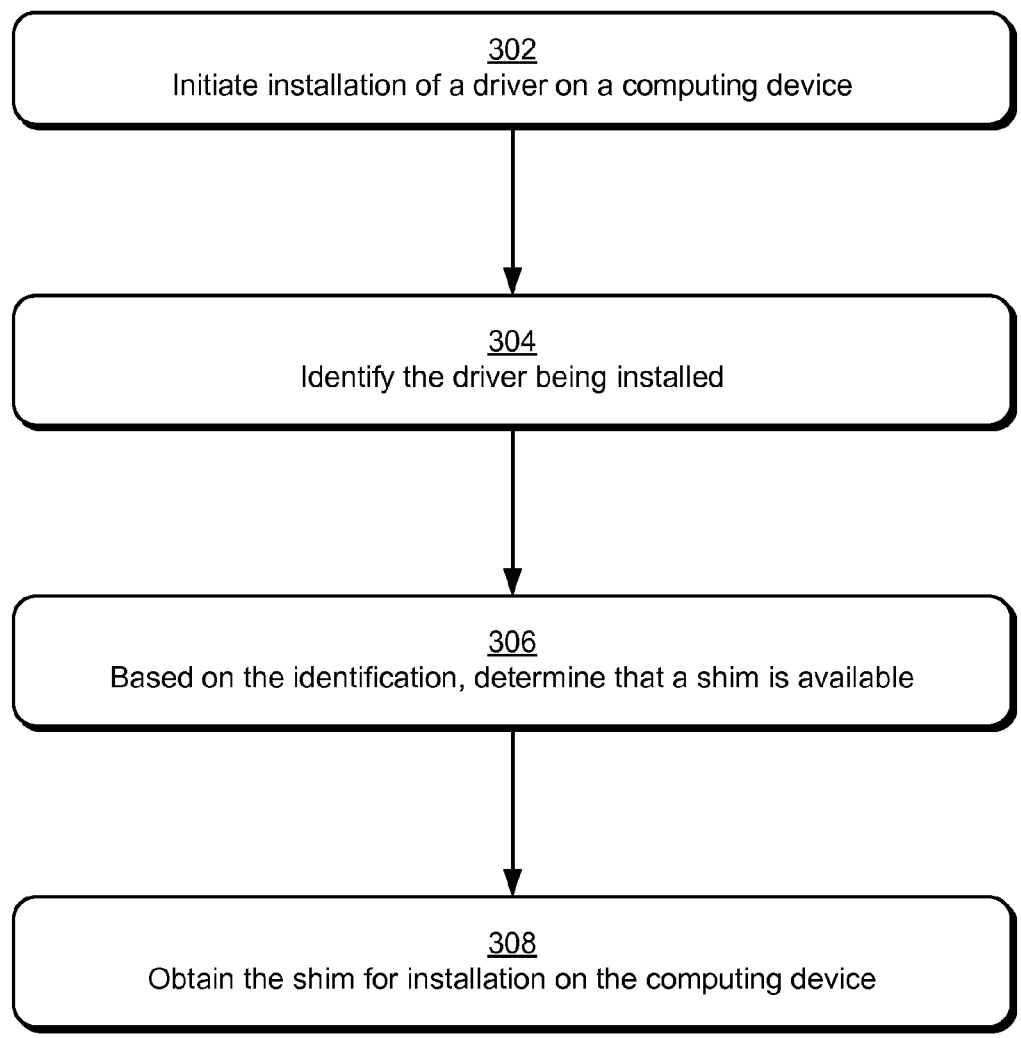
FIG. 3 is a flow diagram depicting a procedure in an example implementation in which identification of a driver is used as a basis for installing a shim during an installation process of the driver.

FIG. 3 depicts a procedure 300 in an example implementation in which identification of a driver is used as a basis for installing a shim during an installation process of the driver. Installation of a drive on a computing device is initiated (block 302). A user, for instance, may connect a device 112 to the computing device 102, detection of which may automatically cause initiation of driver 114 installation on the computing device 102. A variety of other examples are also contemplated, such as manual initiation of the process by a user of the computing device 102.

A driver being installed is identified (block 304), which may be based on a identification of the driver 114 itself, a device 112 that corresponds to the driver 114, functionality of the driver 114, and so on. Based on the identification, a determination is made that a shim is available (block 306). This determination may be performed locally by the shim engine 116, involve communication with a service provider 202 via a network 204, and so on.

The shim may then be obtained for installation on the computing device (block 308). Continuing with the previous example, the shim manager module 206 may query a repository 208 based on a driver identifier 210 to locate issues that pertain to the driver and/or locate one or more shims 118 directly. The one or more shims 118 that are located may then be communicated back to the computing device 102 for installation.

Figure 4:
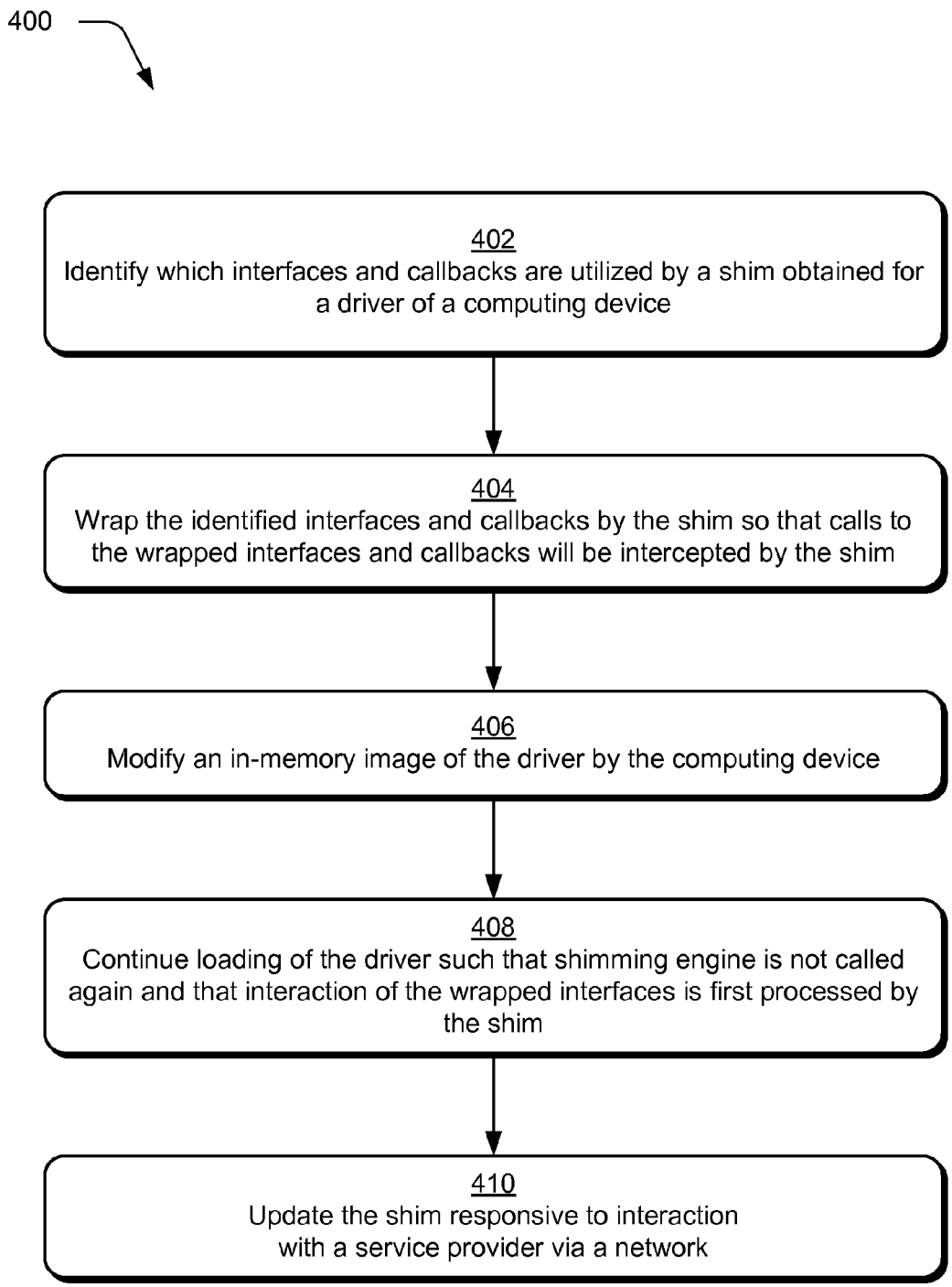
FIG. 4 is a flow diagram depicting a procedure in an example implementation in which a shim is installed on a computing device to promote compatibility of a driver with a kernel of an operating system as well as other drivers of the computing device.

FIG. 4 depicts a procedure 400 in an example implementation in which a shim is installed on a computing device to promote compatibility of a driver with a kernel of an operating system as well as other drivers of the computing device. An identification is made as to which interfaces and callbacks are utilized by a shim obtained for a driver of a computing device (block 402). A shim engine 116, for instance, may determine which APIs and/or event declarations involve a shim 118 that is being stalled on a computing device 102.

The identified interfaces and callbacks are then wrapped by the shim so that calls to the wrapped interfaces and callbacks will be intercepted by the shim (block 404). The shim engine 116, for instance, may replace entries in an import access table (IAT), dispatch table, and so on such that communications between the driver 114 and other components of the computing device (e.g., the kernel 110, other drivers 216, and so on) are intercepted by the shim 118. This process may involve resolving addresses of the interfaces to be wrapped, which can be exports from various other drivers in a kernel, class drivers, and so on.

An in-memory image of the driver is modified by the computing device (block 406) and loading of the driver is continued such that the shimming engine is not called again and that interaction of the wrapped interfaces is first processed by the shim (block 408). Thus, the shim engine 116 may be employed to install the shim 118 as part of the driver 114 or other component of the computing device 102 but then is not involved further such that execution is not slowed. Therefore, the driver 114 may execute at near full speed with the difference being that execution of the wrapped interfaces and callbacks will go first through the wrappers declared in the applied shims. Although installation of a single shim was described, it should be readily apparent that this process may be employed for multiple shims, e.g., for multiple identified issues of a driver 114.

Figure 5:
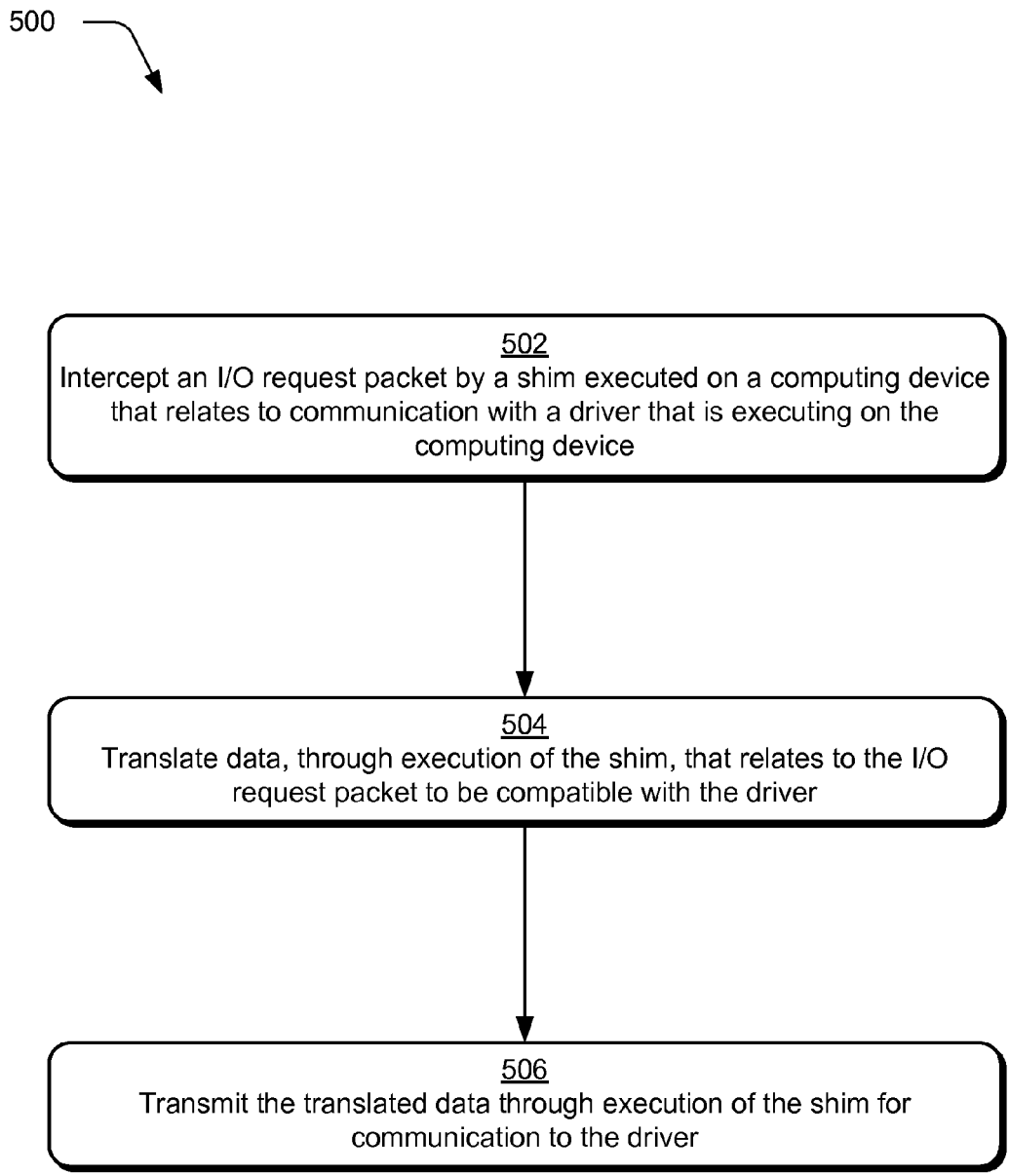
FIG. 5 is a flow diagram depicting a procedure in an example implementation in which I/O request packet (IRPs) are intercepted by a shim to promote driver compatibility.

FIG. 5 depicts a procedure 500 in an example implementation in which I/O request packet (IRPs) are intercepted by a shim to promote driver 114 compatibility. An I/O request packet (IRP) is intercepted by a shim executed on a computing device that relates to communication with a driver that is executing on the computing device (block 502). The IRP, for instance, may be generated responsive to occurrence of an event on a computing device 102. The IRP may then be intercepted by the shim 118 by modifying a dispatch table such that the IRP is routed to the shim 118 and not the driver 114 upon communication of the IRP responsive to the event.

Data is translated, through execution of the shim, that relates to the I/O request packet to be compatible with the driver (block 504). The data, for instance, may be a payload of the packet, data located at an address that referenced by a pointer in the IRP, and so on. This data may be translated by the shim 118 for compatibility with communications that involve the driver 114, such as communications to or from the driver 114 to another component, such as the kernel 110, other driver 216, and so on. The translated data may then be transmitted through execution of the shim for communication to the driver (block 506), such as by employing the IRP techniques previously describe such that an originally intended driver may receive the data, either directly or indirectly through communication through another shim 118. A variety of other examples are also contemplated as described above.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
for a computing device having a first operating system, the first operating system including a kernel, updating the first operating system to a second operating system, the second operating system including a kernel, the first operating system being a previous version of the second operating system;
obtaining a shim configured to enable communication between the second operating system and a driver, the driver being configured to communicate with the kernel of the first operating system in at least a manner that does not involve an a application programming interface associated with the first operating system, the driver being compatible with the first operating system, but incompatible with the second operating system absent the shim; and
routing communication between the second operating system and the driver through the obtained shim, including using the obtained shim to correct incompatibilities between the driver and the kernel of the second operating system by using the obtained shim to intercept at least some data that is used to support communication from the kernel of the second operating system to the driver without involving an application programming interface associated with the second operating system, translating at least some of the intercepted data, and providing at least some of the translated data to the driver.

2. A method as described in claim 1, wherein the driver is also configured to communicate with the first operating system via a call to an application programming interface associated with the first operating system and wherein routing communication between the second operating system and the driver further includes using the obtained shim to modify both an input and output of the application programming interface call.

3. A method as described in claim 1, further comprising a shim engine installing the shim but then being excluded in execution of the driver after installing the shim.

4. A method as described in claim 1, wherein the driver is further configured to communicate with the first operating system via a call to an application programming interface (API) associated with the first operating system and wherein the communication between the second operating system and the driver further comprises communications via an application programming interface (API).

5. A method as described in claim 4, further comprising replacing import address table (IAT) entries of one or more application programming interfaces and saving the replaced import address table (IAT) entries in a hooking table.

6. A method as described in claim 1, wherein the data that is used to support communication from the kernel of the second operating system to the driver without involving an application programming interface associated with the second operating system involves the use of I/O request packets (IRP).

7. A method as described in claim 6, further comprising replacing entries in a dispatch table for use in conjunction with the I/O request packets (IRPs) to allow the obtained shim to intercept the I/O request packets.

8. A method as described in claim 1, further comprising routing through the shim communications between another driver that is executable on the computing device and the driver.

9. A method as described in claim 1, further comprising:
capturing data via one or more hooks;
translating the data to mimic an earlier version of an operating system; and
communicating the translated data to the driver.

10. A method as described in claim 1, wherein obtaining a shim comprises obtaining a shim via a network connection from a service provider that includes a repository responsive to communication of an identifier of the driver that is to be installed on the computing device.

11. A computing device comprising:
one or more processors; and
one or more computer readable storage media storing instructions thereon that are executable by the one or more processors to:

update a first operating system on the computing device to a second operating system, the first operating system being a previous version of the second operating system, the first operating system having a kernel and the second operating system having a kernel;

initiate installation of a driver that is compatible with the first operating system on the computing device, the driver being configured to communicate with the kernel of the first operating system in at least a manner that does not involve an application programming interface associated with the first operating system;

identify the driver to be installed;

based at least on the identification, determine whether the driver has compatibility issues with the second operating system;

based at least on a determination that the driver has compatibility issues with the second operating system, determine whether a shim is available for the driver;

based at least on a determination that a shim is available, obtain the determined shim for installation on the computing device; and install the shim on the computing device, thereby enabling the driver to communicate with the second operating system by routing communication between the second operating system and the driver through the shim, the shim correcting incompatibilities between the driver and the kernel of the second operating system by intercepting data used to support communication from the kernel of the second operating system to the driver without involving an application programming interface associated with the second operating system, translating at least some of the intercepted data, and providing at least some of the translated data to the driver.

12. A computing device as described in claim 11, wherein the data that is used to support communication from kernel of the second operating system to the driver without involving an application programming interface associated with the second operating system involves the use of I/O request packets (IRPs) and wherein the one or more computer readable storage media store instructions thereon that are executable by the one or more processors to modify a dispatch table so that the shim can intercept the I/O request packets (IRPs).

13. A computing device as described in claim 11, wherein the shim also corrects incompatibilities between the driver and an application programming interface (API) associated with the second operating system and wherein the one or more computer readable storage media store instructions thereon that are executable by the one or more processors to modify an import access table (IAT) so that the shim can intercept calls to the application programming interface (API).

14. A computing device as described in claim 11, wherein the data that is used to support communication from the kernel of the second operating system to the driver without involving an application programming interface associated with the second operating system involves the use of I/O request packets (IRPs) and wherein the one or more computer readable storage media store instructions thereon that are executable by the one or more processors to:

intercept the I/O request packets (IRPs) that relate to communication with the driver;

translate at least some of the data associated with the intercepted I/O request packet (IRP) to be compatible with the driver; and provide at least some of the translated data for communication to the driver.

15. One or more computer readable storage media storing instructions thereon that when executed by one or more processors cause a computing system to:

update a first operating system on the computing device to a second operating system, the first operating system being a previous version of the second operating system, the first operating system having a kernel and the second operating system having a kernel;

initiate installation of a driver that is compatible with the first operating system on the computing device, the driver being configured to communicate with the kernel of the first operating system in at least a manner that does not involve an application programming interface associated with the first operating system;

identify the driver to be installed;

based at least on the identification, determine whether the driver has compatibility issues with the second operating system;

based at least on a determination that the driver has compatibility issues with the second operating system, determine whether a shim is available for the driver;

based at least on a determination that a shim is available, obtain the determined shim for installation on the computing device; and install the shim on the computing device, thereby enabling the driver to communicate with the second operating system by routing communication between the second operating system and the driver through the shim, the shim correcting incompatibilities between the driver and the kernel of the second operating system by intercepting data used to support communication from the kernel of the second operating system to the driver without involving an application programming interface associated with the second operating system, translating at least some of the intercepted data, and providing at least some of the translated data to the driver.

16. One or more computer readable storage media as described in claim 15, wherein the data that is used to support communication from the kernel of the second operating system to the driver without involving an application programming interface associated with the second operating system involves the use of I/O request packets (IRPs) and wherein the one or more computer readable storage media store instructions thereon that are executable by one or more processors to modify a dispatch table so that the shim can intercept the I/O request packets (IRPs).

17. One or more computer readable storage media as described in claim 15, wherein the shim also corrects incompatibilities between the driver and an application programming interface (API) associated with the second operating system and wherein the one or more computer readable storage media stores instructions thereon that are executable by one or more processors to modify an import access table (IAT) so that the shim can intercept calls to the application programming interface (API).

18. One or more computer readable storage media as described in claim 15, wherein the data that is used to support communication from the kernel of the second operating system to the driver without involving an application programming interface associated with the second operating system involves the use of I/O request packets (IRPs) and wherein the one or more computer readable storage media stores instructions thereon that are executable by one or more processors to:

intercept the I/O request packets (IRPs) that relate to communication with the driver;

translate at least some of the data associated with the intercepted I/O request packet (IRP) to be compatible with the driver; and provide at least some of the translated data for communication to the driver.

19. One or more computer readable storage media as described in claim 15, wherein the one or more computer readable storage media stores instructions thereon that are executable by one or more processors to translate, through the execution of the shim, data that is involved in a callback to the driver.

20. One or more computer readable storage media as described in claim 15, wherein the shim also intercepts data that is used to support communication from the kernel of the second operating system to the driver that does involve a call to an application programming interface.

* * * * *